SIGNAL RECEIVING DEVICE

Filed Jan. 3, 1955 2 Sheets-Sheet 1

June 3, 1958 M. A. PRETCEILLE 2,837,604

SIGNAL RECEIVING DEVICE

Filed Jan. 3, 1955 2 Sheets-Sheet 2

United States Patent Office 2,837,604

Patented June 3, 1958

2,837,604

SIGNAL RECEIVING DEVICE

Maurice Armand Pretceille, Conflans Sainte-Honorine, France, assignor to Lignes Telegraphiques & Telephoniques, Paris, France, a French company Application January 3, 1955, Serial No. 479,636

Claims priority, application France January 22, 1954

4 Claims. (Cl. 179—84)

This invention relates to receiving devices and more particularly to receiving devices for keyed or "on-off" signals.

An object of the present invention is to provide a receiving device for a keyed or "on-off" signal, using a keyed carrier wave.

Such a signal may be, for instance, a voice frequency telegraph signal, a ringing signal, or a remote control signal. The current which is derived from the signal and which flows through the winding of a telegraph or similar electromechanical relay is independent, within limits, of the amplitude of a signal voltage applied at the input to the receiving device. It is thus possible to obtain a good retransmission by this relay of the above signals, within wide limits of variation of their amplitudes.

An important feature of the invention consists of controlling by said signals a current with a frequency F and a constant amplitude which is supplied from a local source, and is modulated by said signals, which after amplification (or possibly without any amplification) is rectified and operates the above-mentioned relay.

The device which allows modulation of the current of frequency F may be a ring type modulator consisting of germanium rectifiers or of copper-copper oxide rectifiers.

The invention will be disclosed in greater detail by means of the drawings in which.

Figure 1:
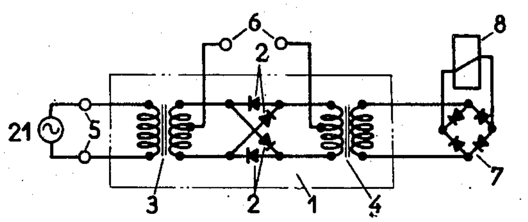
Figure 1 shows an assembly, in accordance with the invention, with no amplifier.
Figures 2, 3:
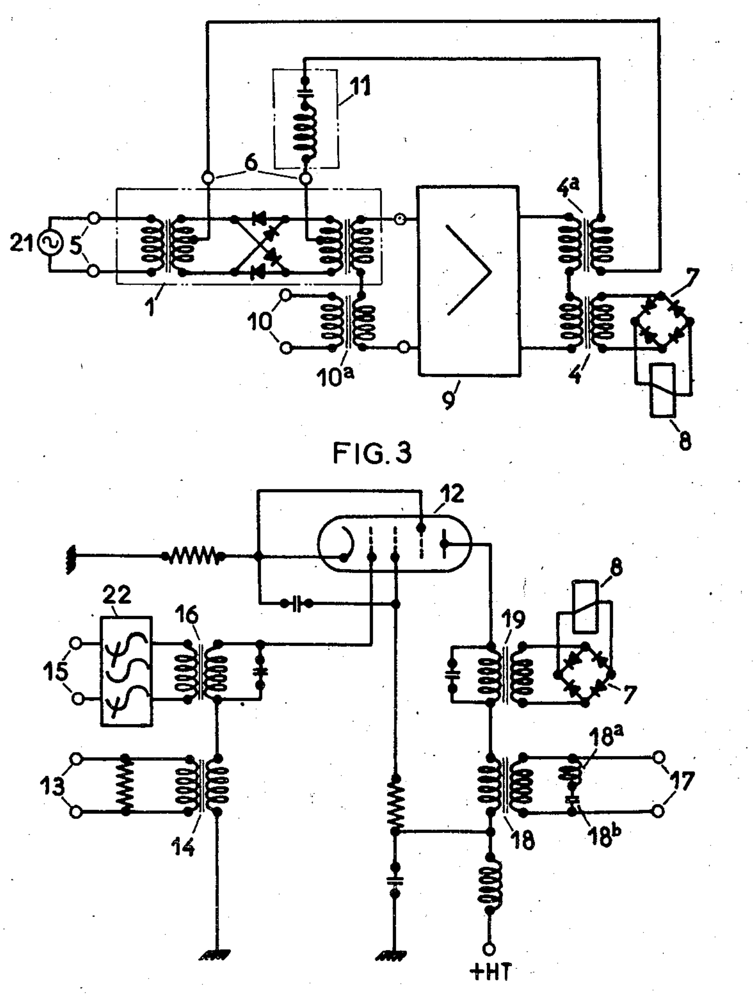
Figure 2 illustrates an assembly in accordance with the invention, with an amplifier.
Figure 3 shows a receiving device of known type in a telecommunication system.

In Figure 1, a ring type modulator 1 is represented, comprising rectifiers 2 and transformers 3 and 4. An A. C. voltage with a frequency F, from a source 21, is applied at terminals 5 of the transformer 3. At the mid points of the windings of transformers 3 and 4 is applied a keyed wave with a carrier frequency T, which, when it exists at terminals 6, ensures the passing gating of the current of frequency F towards the rectifier 7. The voltage thus rectified actuates the telegraph relay 8. This voltage is independent of the amplitude of the voltage of the applied signals and depends only on the amplitude of the voltage supplied by the local source 21, as far as the said signal voltage is high enough actuating the gating means or for rendering the rectifiers conducting. As stated above, an amplifier 9 may be inserted between the modulator 1 and rectifier 7 as shown in Figure 2.

As a feature of the invention, the amplifier 9 may also be used, possibly, for amplifying the keyed signals before the latter are applied to the modulator 1; the signals then arrive from terminals 10 to the amplifier 9 (Figure 2) through the transformer 10$a$; in the circuit, between a transformer 4$a$ at the output from the amplifier 9 and the terminals 6 of the modulator 1, is placed a resonant circuit 11 tuned to the frequency T of the carrier wave of the keyed signals.

This device in accordance with the invention, may be used in the receiving devices for ringing signals in carrier current communication equipment using voice frequency signalling or channel carrier wave signalling.

One feature of the invention consists in using, as a local A. C. source in said equipments, the modulating wave which is used for transposing each channel to the frequency spectrum position allotted to it in a channel group.

In a known type of such equipment, the so-called "double modulation type," the signalling frequency is the same for all channels, and it is supplied by the first modulation carrier frequency, 8 kc./s., for instance which is chopped by a relay at the rhythm of the automatic switching or manual switching signals to be re-transmitted.

In some 12-channel equipment, the frequency F is, according to the channel, between 20 kc./s. and 100 kc./s., this frequency being that of the channel carrier wave.

There is represented in Figure 3, by way of example, a receiving device used for such equipment. The amplifier device is represented by way of example as a pentode tube 12 and is used for amplifying the speech currents which arrive from terminals 13 through a low frequency transformer 14 and for signalling currents which arrive from terminals 15 through a band pass filter 22 and a transformer 16 tuned to 8 kc./s. At the output from the amplifier tube, the speech currents are transmitted at terminals 17 through a low frequency transformer 18. A resonant circuit consisting of an inductance 18$a$ and a condenser 18$b$ is in shunt across the terminals of transformer 18. The signalling currents, after amplification, are transmitted through the transformer 19 tuned to 8 kc./s., to the rectifier device 7 and are then applied to the relay 8.

Figure 4:
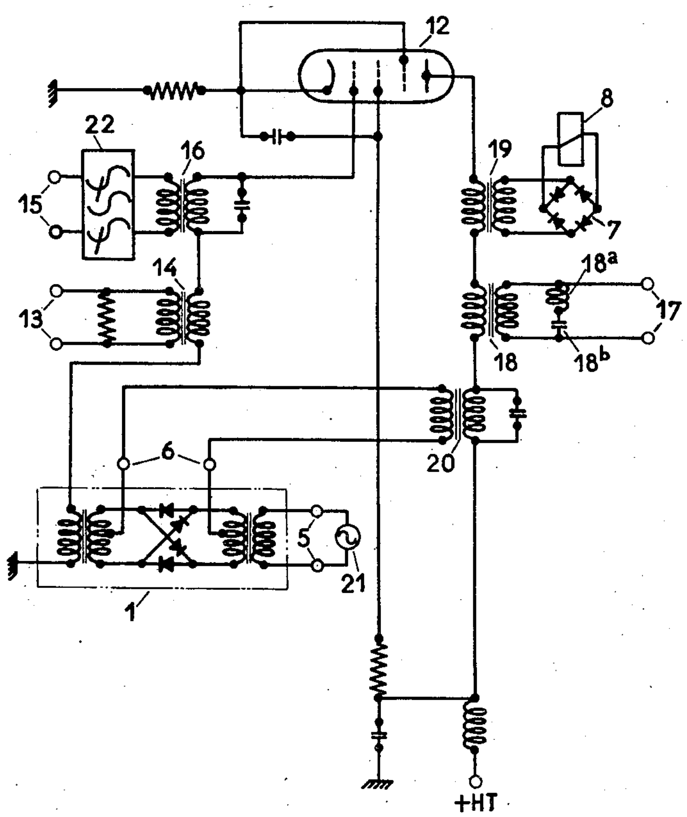
Figure 4 shows the receiving device of Figure 3 wherein an assembly in accordance with the invention has been incorporated.

In order to make the current through the relay 8 independent, within limits, of the amplitude of the input voltage, at terminals 15, it has been suggested in previously known systems to make arrangements for the amplifier tube to be saturated; in case the received levels are low, this requires an input transformer 16 with a high transformation ratio, which may raise certain difficulties. These difficulties are avoided by introducing, in the device of Figure 3 an assembly, in accordance with the present invention, such as the assembly represented in Figure 4. In this device, the amplifier tube 12 which amplifies the speech currents and the keyed signals of frequency T, is also used for the amplification of the current of frequency F modulated by T. The signalling currents received at terminals 15 and amplified by the tube 12, are transmitted through the transformer 20 (tuned to 8 kc./s.) to the terminals 6 of the modulator 1, wherein they modulate the current of frequency F applied at terminals 5 by the local source 21. The current of frequency F, modulated by the current of frequency T is amplified by the tube 12 and transmitted to the relay 8 through the transformer 19 and the rectifier device 7.

The signals retransmitted by the relay are thus indedependent of the input signal level and their distortion is negligible.

The rectifiers which make up the modulator 1 may, for instance, be of the germanium type and those making up the rectifier device 7, for rectifying and supplying the relay 8 may be the copper-copper oxide type.

There will now be obvious to those skilled in the art many modifications and variations utilizing the principles set forth and realizing many or all of the objects and advantages of the circuits described but which do not depart essentially from the spirit of the invention.

What is claimed is:

1. A receiving device for carrier wave keyed signals comprising a modulator made of four rectifiers in bridge connection and of an input transformer and an output transformer, said modulator having input terminals, carrier wave terminals and output terminals respectively connected to one winding of said input transformer, one winding of said output transformer and mid-point tappings provided in each one of the other windings of both said transformers, an alternating current source, means for applying voltage from said alternating current source to said input terminals, means for applying said signals to said carrier wave terminals, a further rectifier having input alternating current and output direct current terminals, means for applying voltage received at said output terminals to said further rectifier, and means for connecting a winding of an electromechanical relay to said output direct current terminals of said further rectifier.

2. A receiving device as claimed in claim 1, wherein both said signals and output voltage from said modulator are amplified in a common electron tube having a cathode, a control grid and an anode and wherein said signals and output voltages are applied in series to said control grid of said tube, while said further rectifier is connected at its alternating current terminals to one winding of a further transformer, another winding of which is energized by the anode current of said tube.

3. A receiving device as claimed in claim 2, wherein said signals and output voltage from said modulator are amplified together with speech currents in a common electron tube having at least a cathode, a control grid and an anode and wherein said signals are applied to said control grid through a filter tuned to the carrier wave frequency of said signals and through a first input transformer, while the voltage from said source is applied to said control grid through a second input transformer and said speech currents are applied thereto through a third input transformer, all the three of said transformers having one of their windings in series connection in the control grid circuit of said tube, the anode current of said tube flowing through one winding of each one of three output transformers, another winding of the first of which is connected to said alternating current terminals of said further rectifier to feed said relay, the second of which has another winding connected to a utilization circuit for amplified speech currents and the third of which has another winding connected to said carrier wave terminals of said modulator.

4. A device as claimed in claim 3, wherein one winding of said second output transformer is shunted by a series-resonant circuit tuned to the carrier frequency of said keyed signals.

References Cited in the file of this patent

UNITED STATES PATENTS

| | | |
|---|---|---|
| 2,301,961 | Logan | Nov. 17, 1942 |
| 2,414,440 | Brandt | Jan. 21, 1947 |
| 2,515,553 | Flowers | July 18, 1950 |
| 2,535,104 | Van Mierlo | Dec. 26, 1950 |
| 2,537,998 | Henguet | Jan. 16, 1951 |
| 2,594,007 | Gardere | Apr. 22, 1952 |
| 2,596,977 | Brandt | May 20, 1952 |